United States Patent Office
3,107,145
Patented Oct. 15, 1963

3,107,145
PROCESS FOR DEFLUORINATING
PHOSPHATIC MATERIALS
John H. Hinkle, Jr., Houston, and Everett J. Weaver and
Lynnval M. Smith, Pasadena, Tex., assignors, by mesne
assignments, to Hooker Chemical Corporation, New
York, N.Y., a corporation of New York
No Drawing. Continuation of application Mar. 21, 1956,
Ser. No. 572,798. This application Aug. 17, 1960, Ser.
No. 50,289
2 Claims. (Cl. 23—108)

This invention relates to phosphatic animal feed, and more particularly to methods for the preparation of defluorinated feed grade phosphatic materials from low grade materials.

This application is a continuation of our copending application of the same title, Serial Number 572,798, filed March 21, 1956, and now abandoned.

It is a principal object of the invention to provide a method of preparing phosphatic mineral feeds from precipitated phosphatic sludge.

Another object of the invention is to provide such a method whereby the product prepared is of at least feed grade quality.

Another object of the invention is to provide a method of preparing tricalcium phosphate using a phosphatic sludge precipitated from crude wet-process phosphoric acid by the addition of a calcium-containing material to the sludge.

A further object of the invention is to provide a method of preparing feed grade tricalcium phosphate by calcination of low grade phosphatic salts.

A still further object of the invention is to provide such a feed grade material having a highly available phosphate content.

Other objects, uses, advantages, and improvements of the invention will appear from the following description of preferred embodiments thereof and from the examples illustrating the embodiments:

Wet-process phosphoric acid is produced by the reaction of dilute sulphuric acid with ground phosphate rock:

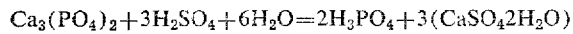

$$Ca_3(PO_4)_2 + 3H_2SO_4 + 6H_2O = 2H_3PO_4 + 3(CaSO_4 2H_2O)$$

The calcium sulphate is obtained as gysum, which is filtered from the phosphoric acid. Depending on the concentration of phosphoric acid desired, additional reactions of phosphate rock and sulphuric acid may be made using a weak phosphoric acid as the diluent, thereby increasing the concentration of the phosphoric acid. The phosphate rock contains fluorine in addition to $Ca_3(PO_4)_2$ (supra) and most of the fluorine results in the phosphoric acid produced. The phosphate rock also contains iron, aluminum, silica, and a number of other contaminating materials in lesser amounts, including organic contaminants (tars, oils, etc.) which result from flotative separation of phosphate rock from other minerals with which it occurs. All of these contaminants are present to some extent in the crude phosphoric acid produced by the so-called "wet-process" method.

Crude wet process phosphoric acid contains a number of impurities which are objectionable when carried over into animal feed materials prepared from the crude acid. Therefore, it is necessary in preparing animal feed materials from the crude acid to remove these objectionable impurities from the acid at some stage in the preparation. The acid purification is usually accomplished as a preliminary step in the preparation by precipitating the impurities by addition of a chemical precipitant, usually a basic material which reacts with the objectionable constituents to precipitate them and which invariably also reacts with a part of the phosphoric acid to precipitate phosphate salts along with the precipitated objectionable impurities. The principal impurity in crude wet-process phosphoric acid from the standpoint of animal feeding is fluorine, which can remain in the feed materials only in very small concentration. It is generally considered that the allowable fluorine concentration in animal feeds depends on the phosphorus concentration, and that the ratio, F/P should be not greater than 1/43.5 in the feeds (equivalent to $F/P_2O_5$ not greater than 1/100). Other impurities in the acid are iron and aluminum compounds and organic materials, which are not universally considered objectionable as such in the feeds, but the iron and aluminum compounds are thought by some authorities to reduce the availability of the phosphates in the feeds, perhaps by combining with part of the phosphorus.

The precipitation of these impurities is often carried out in two steps, a concentrated brine (NaCl) solution being first added to the acid to precipitate a large proportion of the fluorine as sodium silico fluoride ($Na_2SiF_6$). Some of the organic impurities in the acid are salted out in the brine precipitation, which precipitates only a small amount, or none, of the iron, aluminum, and phosphate compounds. The acid is then filtered and subjected to a second precipitation with a lime (CaO) solution, the lime acting to precipitate an additional amount of fluorine, a part of the phosphates, a large proportion of the iron and aluminum, and in addition more of the organic impurities are salted out of the acid. The proportion of phosphate compounds which are precipitated from the acid depends on the amount of lime used, it usually being necessary to add enough lime to precipitate about 20% of the phosphates in order to make the fluorine concentration of the acid suitable for feed grade material manufacture. Precipitants other than brine may be used for the initial precipitation, including sodium carbonate ($Na_2CO_3$), which is superior to brine in that it does not increase the corrosive qualities of the acid through addition of halogens to the acid. The initial precipitate, largely sodium silico fluoride, which is very slimy and difficult to handle, may be subjected to purification processes whereby sodium silico fluoride is recovered as a by-product. The second precipitate may be dried or pelleted to produce a phosphatic fertilizer material, the available (citrate soluble) phosphorus content of the dried material being in the neighborhood of 40% $P_2O_5$.

Alternatively, the initial precipitation with brine or other sodium salts may be omitted and a lower grade fertilizer material may be produced by a single lime precipitation. However, the initial precipitation is desirable because otherwise the lime precipitated material contains all of the slimy materials usually separated in the initial precipitation and becomes difficult to handle during drying or pelleting, and the fertilizer produced is of lower analysis.

It is with the precipitate obtained by the addition of lime to the crude wet-process phosphoric acid, preferably following a preliminary precipitation of the acid with sodium carbonate, that this invention is concerned. Sale of this material in a dry condition as a fertilizer material is economically undesirable because of the low price of phosphatic fertilizers. The material is not usable in animal feeds as a source of phosphorus because of its high fluorine content. It is, therefore, highly desirable to reduce the amount of fluorine in the material so that the material may be sold at a higher price for use in animal feed supplements as a source of phosphate.

Applicants have discovered that the lime-precipitated material, and other phosphatic materials containing objectionable amounts of fluorine, may be converted to phosphatic feed grade materials of higher value. According to the novel process discovered by applicants, a calcium-containing material is admixed with the low grade material which is then heated. Fluorine is evolved from the material primarily as $SiF_4$, and sulphur as $SO_2$—$SO_3$. Along the calcium-containing materials which have proved useful for the process are gypsum, acidulated ($H_2SO_4$) phosphate rock (principally apatite, $$Ca_5(F, Cl)(PO_4)_3$$

and/or collophanite, $Ca_3(PO_4)_2:H_2O$), lime $$(CaO, Ca(OH)_2)$$

and calcium carbonate ($CaCO_3$). Other tests have indicated that other calcium salts are equally effective.

A typical sample of the lime-precipitate, prepared by adding a small amount of saturated sodium carbonate solution to the crude phosphoric acid, filtering out the resulting precipitate, adding enough lime solution to precipitate about 20% of the —$PO_4$ present in the acid, and then filtering the lime-precipitate from the acid, contained 13.9% $H_2O$, 2.7% F, 36.0% P as $P_2O_5$, 21.5% Ca as CaO, and 6.3% $SO_4$ as $H_2SO_4$. The ratio, $P_2O_5/CaO$, was 1.67 for the material, and the ratio $F/P_2O_5$ was 1/13.3, or about 7.5 times the F concentration allowable in feed grade phosphate materials.

The lime-precipitate having the analysis given above was treated according to the present invention to reduce its fluorine concentration and make it suitable for use as animal feeding material. The resulting material in each case had a ratio, $F/P_2O_5$, less than 1/100.

As stated heretofore, the method of the invention comprises admixing a quantity of a calcium-containing material with the lime-precipitate and heating the mixture to remove the fluorine and sulphur compounds. The amount of calcium-containing material used determines the phosphate content of the final product. Usually a phosphate content of between 13% and 22% $P_2O_5$ is desired, so the amount of calcium material to be added in any case is that amount which will dilute the $P_2O_5$ concentration to the proper value in the final product. When acidulated phosphate rock is used as the calcium material, the amount of $H_2SO_4$ to be added with the rock is variable, usually enough sulphuric acid being used to digest the rock so that its fluorine content will also be removed. Water may be added to the mixture as desired, the method giving satisfactory results when the materials are mixed dry before heating as well as when the materials are mixed as a water slurry before heating. The heating may be done in any manner, and is conveniently done in a rotary kiln with the material in contact with the flame and hot gases passing through the kiln. The mixture is usually heated at about 2200° F. for a period of about 30 minutes to one hour, but temperatures between 1500° F. and 3000° F. and heating periods between 15 minutes and four hours may be used. The mixing of the lime-precipitate and the calcium-containing material may be done in any suitable manner. The rate of heating of the material is of no importance. The heating time required is somewhat shorter when the heating is done in the presence of a moving inert gas or air stream, and agitation of the mixture during heating is beneficial to insure uniform heating and to permit the evolved gases to escape.

Illustrations of ways in which the invention may be performed and the results achieved are contained in the following Examples I–VIII, the lime-precipitate described above being used in each of the examples:

Example I

To 25 parts by weight of the lime-precipitate there was added 11 parts by weight of waste gypsum from phosphoric acid manufacture. These solid materials were mixed in the dry state and then heated without agitation in an electric furnace. The heating temperature was 1900° F. and the material was heated for one hour spread in a thin layer. After the heating period, the product was cooled to room temperature in still air and analysed. The product contained 0.39% F, 42.0% P as $P_2O_5$, and 40.7% Ca as CaO. The ratio $F/P_2O_5$ was 1/107, and the ratio $P_2O_5/CaO$ was 1.03. The product was of a very light gray color and was easily broken into a free flowing powder.

Example II

A mixture was made identically as in Example I except that 37 parts by weight of water was added to the dry materials before mixing. The mixture was heated as in Example I, cooled, and analysed. The product contained 0.38% F, 42.2% P as $P_2O_5$, and 40.8% Ca as CaO. The ratio, $F/P_2O_5$, was 1/111 and the ratio, $P_2O_5/CaO$, was 1.03.

Example III

To 21 parts by weight of the lime precipitate there was added 13 parts by weight of ground phosphate rock (75 BPL, 90% through 100 mesh) and 6.5 parts by weight of alkylation sulphuric acid (100% $H_2SO_4$ basis). The combined materials were mixed and then the mixture, which was relatively dry, was spread in a thin layer and heated at 2200° F. for one-half hour. After cooling, the product was analysed. The product contained 0.35% F, 43.9% $P_2O_5$, 40.0% CaO, and 1.7% $H_2SO_4$. The ratio, $F/P_2O_5$, was 1/125, and the ratio, $P_2O_5/CaO$ was 1.10.

Example IV

A mixture was made as in Example III except that 45 parts by weight of water was added and mixed with the constituents. The mixture was heated as in Example III, cooled, and analysed. The product contained 0.30% F, 43.9% $P_2O_5$, 40.2% CaO, and 1.5% $H_2SO_4$. The ratio, $F/P_2O_5$, was 1/146, and the ratio $P_2O_5/CaO$, was 1.09.

Example V

To twenty parts by weight of lime-precipitate were added 3.3 parts by weight of dry lime. The constituents were mixed dry and then heated for three hours at 2000° F. in an electric furnace. After cooling, the product was analysed and contained 0.18% F, 44.7% $P_2O_5$, 39.8% CaO, and 0.26% $H_2SO_4$. The ratio, $F/P_2O_5$, was 1/248, and the ratio, $P_2O_5/CaO$, was 1.12.

Example VI

A mixture of lime-precipitate and dry lime was made as in Example V except that 34 parts by weight of water were added to form a slurry. After mixing, the mixture was heated at 1900° F. for two hours, cooled to room temperature in air, and analysed. The product contained 0.40% F, 44.9% $P_2O_5$, 39.8% CaO, and 0.16% $H_2SO_4$. The ratio, $F/P_2O_5$, was 1/112, and the ratio, $P_2O_5/CaO$, was 1.13.

Example VII

To twenty parts by weight of the lime-precipitate was added 4.4 parts by weight of $Ca(OH)_2$, the constituents mixed dry, and then heated at 2500° F. for one hour. Analysis showed the product to contain 0.25% F, 41.4% $P_2O_5$, 43.7% CaO, and 0.26% $H_2SO_4$. The ratio, $F/P_2O_5$, was 1/165, and the ratio, $P_2O_5/CaO$, was 0.95.

Example VIII

Fifty parts by weight of water, 6.7 parts by weight of $CaCO_3$, and 20 parts by weight of lime-precipitate were mixed as a slurry and afterward heated for 3 hours at 2250° F. After cooling, analysis showed the product to contain 0.41% F, 42.2% $P_2O_5$, 42.2% CaO, and 0.21% $H_2SO_4$. The ratio, $F/P_2O_5$, was 1/103, and the ratio, $P_2O_5/CaO$, was 1.00.

Describing now one manner by which the method of the invention may be performed on a production scale, there is fed to a rotary-blade mixing device, on a continuous basis at constant feed rates, 56.7 tons per day of the lime-precipitate, 35.0 tons per day of ground phosphate rock. 19.4 tons per day of alkylation sulphuric acid (17.5 tons per day $H_2SO_4$), and 54.0 tons per day of water. These materials are mixed as a thick slurry in the mixer, and from the mixer are delivered to the gas exit end of a direct-fired countercurrent rotary kiln. The materials are tumbled as they pass through the kiln to the fire end of the kiln. The average time of detention of the materials in the kiln is about 105 minutes. The temperature of the exit gases at the feed end of the kiln is about 800° F. The product as discharged at the fire end of the kiln is heated to between 2200° F. and 2350° F. The materials passing through the kiln are in intimate contact with the hot gases and are agitated by their tumbling motion in the kiln. The hot product is cooled, ground to break up any lumps formed in the kiln, and delivered to storage bins at a rate of about 75 tons per day. An average analysis shows the material to contain 0.18% F, 43.8% P as $P_2O_5$, 42.0% Ca as CaO, and 0.15% $SO_4$ as $H_2SO_4$. The ratio $F/P_2O_5$ for the product is 1/243, the ratio F/P is 1/106, and the ratio $P_2O_5/CaO$ is 1.04, these being approximate average ratios for the product. The product is a granular powder and has an off-white gray to brown color. The $F/P_2O_5$ ratio for the product is lower than the $F/P_2O_5$ ratios achieved in Examples I–VIII because of the beneficial effect of the moving gas stream and the agitation during heating, mentioned above. Substantially the same results are obtained using gypsum, lime, or calcium carbonate as the calcium-containing additive. The P content of the product may be altered by altering the proportions of lime-precipitate and calcium-containing materials, a larger proportion of lime-precipitate giving a product of higher P content, and a smaller proportion of lime-precipitate giving a product of lower P content.

The ratio $P_2O_5/CaO$ in the products is an indication of the form in which the phosphates occur in the products. The dicalcium phosphate and calcium orthophosphate forms of phosphorus are usually more available to animals than are other forms, such as meta- and pyrocalcium phosphates. A $P_2O_5/CaO$ ratio of 0.9 to 1.1 or higher indicates a high percentage of orthophosphate. The availability of phosphorus to animals is also affected by the presence of sulphur, usually in the sulphate form, and it is desirable to reduce the sulphur content as well as the fluorine content of the product so that the phosphorus will be highly, over 90%, available to animals to which the product is fed.

While preferred embodiments of the invention have been described and illustrated herein, many modifications thereof may be made by a person skilled in the art without departing from the spirit of the invention, and it is intended to protect by Letters Patent all forms of the invention falling within the scope of the following claims.

We claim:

1. Method for preparing phosphatic materials having flourine contents whereby the materials are suitable for use as animal feeds, comprising adding to crude wet process phosphoric acid containing at least 20% phosphoric acid, as $P_2O_5$, an amount of sodium carbonate sufficient to precipitate substantially all of the fluorine present in said acid, removing the precipitate from said acid as a first precipitate, adding to said acid from which said first precipitate has been removed a quantity of lime sufficient to precipitate not over 20% of the phosphorus of said acid, removing the precipitate from said acid as a second precipitate, said acid from which said second precipitate has been removed containing only traces of residual fluorine, said second precipitate containing substantial amounts of fluorine and phosphoric acid, adding to said second precipitate gypsum in amount sufficient to reduce the $P_2O_5$ content thereof, after calcination, to between 13% and 22% $P_2O_5$, and calcining said second precipitate mixture at a temperature between 1500° F. and 3000° F. and below the fusing temperature of the mixture until substantially all of the fluorine content thereof is dispelled.

2. Method for preparing phosphatic materials having fluorine contents whereby the materials are suitable for use as animal feeds, comprising adding to crude wet process phosphoric acid containing at least 20% phosphoric acid, as $P_2O_5$, an amount of sodium chloride sufficient to precipitate almost all of the fluorine present in said acid, removing the precipitate from said acid as a first precipitate, adding to said acid from which said first precipitate has been removed a quantity of lime sufficient to precipitate not over 20% of the phosphorus of said acid, removing the precipitate from said acid as a second precipitate, said acid from which said second precipitate has been removed containing only traces of residual fluorine, said second precipitate containing substantial amounts of fluorine and phosphoric acid, adding lime to said second precipitate, and calcining the lime-second precipitate mixture to drive off the fluorine to produce a low fluorine product.

References Cited in the file of this patent
UNITED STATES PATENTS

| | | |
|---|---|---|
| 2,164,627 | Seyfried | July 4, 1939 |
| 2,360,197 | Butt | Oct. 10, 1944 |
| 2,556,542 | Hollingsworth | June 12, 1951 |
| 2,889,217 | Le Baron | June 2, 1959 |

UNITED STATES PATENT OFFICE
CERTIFICATE OF CORRECTION

Patent No. 3,107,145            October 15, 1963

John H. Hinkle, Jr., et al.

It is hereby certified that error appears in the above numbered patent requiring correction and that the said Letters Patent should read as corrected below.

Column 1, line 44, for "gysum" read -- gypsum --; column 3, line 4, for "Along" read -- Among --; column 4, line 68, for "$P_5O_5$" read -- $P_2O_5$ --.

Signed and sealed this 14th day of July 1964.

(SEAL)

Attest:

ESTON G. JOHNSON            EDWARD J. BRENNER
Attesting Officer            Commissioner of Patents